United States Patent [19]
Yoshida

[11] Patent Number: 5,682,246
[45] Date of Patent: Oct. 28, 1997

[54] IMAGE RECORDING APPARATUS

[75] Inventor: Takehiro Yoshida, Tokyo, Japan

[73] Assignee: Canon Kabushiki Kaisha, Tokyo, Japan

[21] Appl. No.: 34,365

[22] Filed: Mar. 19, 1993

[30] Foreign Application Priority Data

Mar. 19, 1992 [JP] Japan ................... 4-093701

[51] Int. Cl.$^6$ .......................... H04N 1/00; H04N 1/387
[52] U.S. Cl. .................... 358/296; 358/438; 358/450
[58] Field of Search ........................ 358/434–443, 358/450, 296–304

[56] References Cited

U.S. PATENT DOCUMENTS

| | | | |
|---|---|---|---|
| 4,581,656 | 4/1986 | Wada | 358/257 |
| 4,639,791 | 1/1987 | Masaki | 358/300 |
| 4,811,111 | 3/1989 | Kurokawa | 358/257 |
| 4,821,107 | 4/1989 | Naito et al. | 358/256 |
| 4,991,028 | 2/1991 | Kokubu | 358/403 |
| 4,992,827 | 2/1991 | Kobayashi et al. | 355/202 |
| 5,086,487 | 2/1992 | Katayama et al. | 382/56 |
| 5,091,790 | 2/1992 | Silverberg | 358/434 |
| 5,130,806 | 7/1992 | Reed et al. | 358/296 |
| 5,224,156 | 6/1993 | Fuller et la. | 379/100 |
| 5,267,047 | 11/1993 | Argenta et al. | 358/450 X |
| 5,278,666 | 1/1994 | Satomi et al. | 358/443 |
| 5,309,245 | 5/1994 | Hayashi et al. | 358/450 X |
| 5,309,558 | 5/1994 | Rourke et al. | 395/166 |

FOREIGN PATENT DOCUMENTS

| | | | |
|---|---|---|---|
| 326515 | 8/1989 | European Pat. Off. | H04N 1/387 |
| 490471 | 6/1992 | European Pat. Off. | H04N 1/387 |
| 1209270 | 8/1989 | Japan . | |
| 87 07101 | 11/1987 | WIPO | H04N 1/44 |

OTHER PUBLICATIONS

Patent Abstracts of Japan, vol. 13, No. 519 (M–895) kokai 1–209270 (Aug. 1989).

*Primary Examiner*—Peter S. Wong
*Assistant Examiner*—K. Shin
*Attorney, Agent, or Firm*—Fitzpatrick, Cella, Harper & Scinto

[57] ABSTRACT

An image recording apparatus which records a stamp image to identify a recording sheet onto the recording sheet on which an image is recorded. The apparatus includes an input unit to input image data, a memory unit to store stamp image data, a recording unit to record the image data from the input unit and the stamp image data from the memory unit onto a recording sheet, and a number of copies setting circuit to set the number of copies which are recorded by the recording unit. When specific image data is received from a specific partner apparatus, the recording unit performs the recording of one copy irrespective of the set number of copies. The recording unit can be applied to a facsimile apparatus, a printer, a copying apparatus, or the like. The recording unit selects the different stamp image data from the memory every recording of each copy and records the selected stamp image data onto the recording sheet.

49 Claims, 7 Drawing Sheets

FIG. 6B

IMAGE RECORDING APPARATUS

BACKGROUND OF THE INVENTION

1. Field of the Invention

The present invention relates to a recording apparatus for recording a stamp image to identify a recording sheet onto the recording sheet on which an image is recorded.

2. Related Background Art

In a conventional facsimile apparatus, when a plurality of sheets of received original are necessary, the original received image is manually copied by the operator by using a copying apparatus so as to have a plurality of copies.

Therefore, hitherto, in order to obtain a plurality of sheets of received image, the copying operation must be executed a plurality of times on the reception side. For instance, in case of transmitting a reference document by a TV conference system or the like, even when the necessary number of copies has already been known on both of the transmission side and the reception side, the copying operation needs to be performed after completion of the facsimile transmission. There is, consequently, a problem such that the copying operations are troublesome and it takes a time for such operations and the smooth progress of the conference is obstructed.

On the other hand, in order to keep the secrecy or the like, only the predetermined number of copies are used as originals and the stamps are printed onto the recording papers by the operator and the papers are dispersed. However, such operations are troublesome.

SUMMARY OF THE INVENTION

It is an object of the present invention to provide an image recording apparatus which can solve the above problems.

Another object of the invention is to provide an image recording apparatus which can record a stamp image so as to be identified.

Still another object of the invention is to provide an image recording apparatus which can record a plurality of recording sheets so that they can be identified.

Further another object of the invention is to provide an image recording apparatus which can reduce the troublesomeness of the user.

The above and other objects and features of the present invention will become apparent from the following detailed description and the appended claims with reference to the accompanying drawings.

BRIEF DESCRIPTION OF THE DRAWINGS

FIG. 1 is comprised of FIG. 1A and FIG. 1B showing block diagrams of a facsimile apparatus according to an embodiment of the present invention;

DETAILED DESCRIPTION OF THE PREFERRED EMBODIMENTS

Embodiments of the present invention will now be described hereinbelow with reference to the drawings.

Figures 1, 1A:
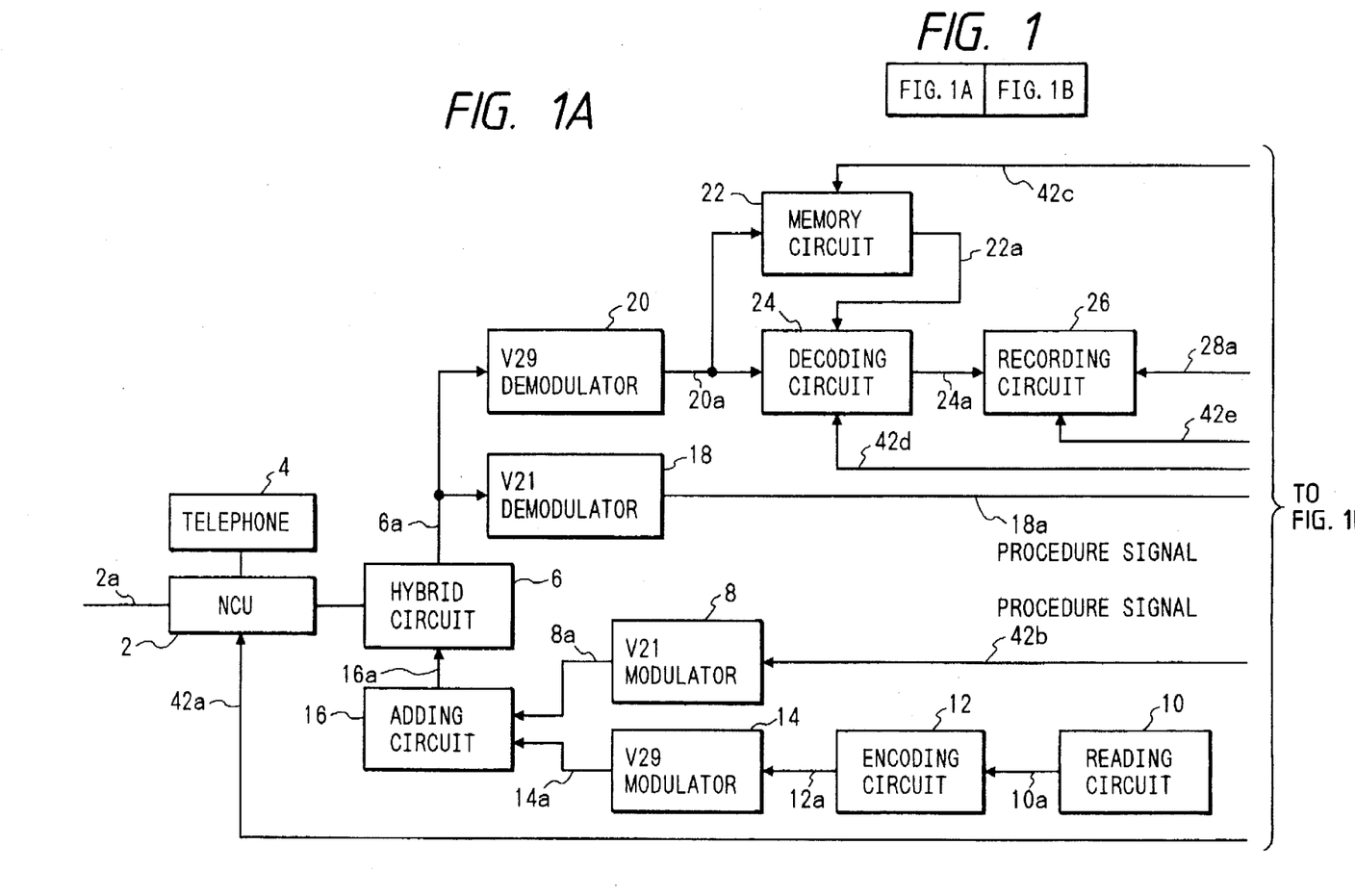
Figure 1B:
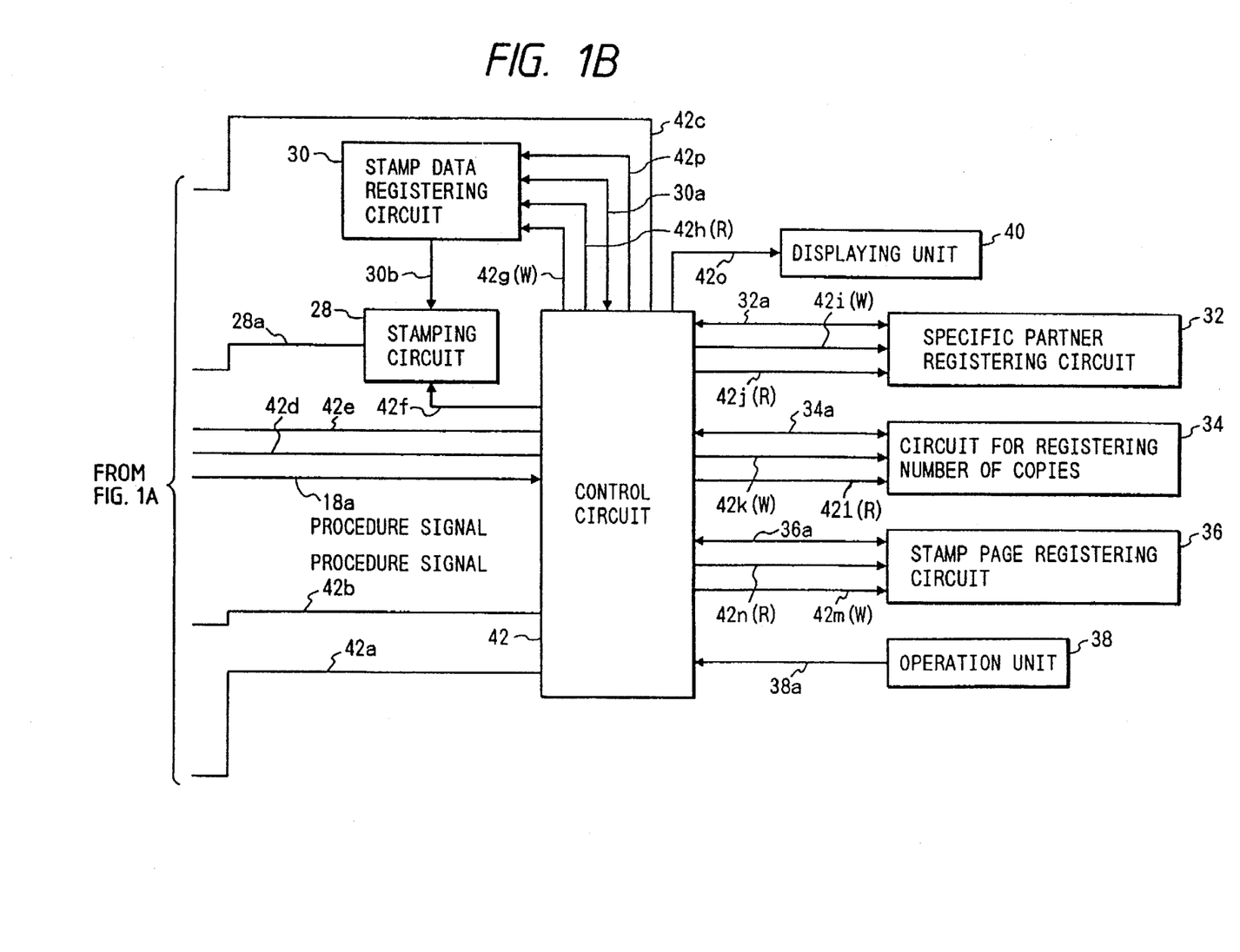

FIG. 1A and FIG. 1B are block diagrams of a facsimile apparatus according to an embodiment of the invention.

An NCU (Network Control Unit) 2 is connected to a terminal of a telephone line in order to use a telephone network for data communication or the like, thereby controlling the connection of a telephone exchange network, switching to a data communication path, or holding a loop. When a signal level (signal line 42a) from a control circuit 42 is set to "0", the NCU 2 connects a telephone line 2a to the side of a telephone 4. When the signal level is set to "1", the NCU 2 connects the telephone line 2a to the side of a facsimile apparatus. In the ordinary state, it is assumed that the telephone line 2a is connected to the telephone 4 side.

A hybrid circuit 6 separates the signal of the transmission system and the signal of the reception system and sends a transmission signal from an adding circuit 16 to the telephone line 2a via the NCU 2 and receives the signal from the partner side via the NCU 2 and sends it to a V29 demodulator 20 and a V21 demodulator 18 via a signal line 6a.

A V21 modulator 8 executes the modulation based on the well-known CCITT recommendation V21 and modulates a procedure signal (signal line 42b) from the control circuit 42 and transmits to the adding circuit 16 through a signal line 8a.

A reading circuit 10 sequentially reads the image signal of one line in the main scanning direction from a transmission original and forms a signal train indicative of a binary value of black and white and sends the binary data to the adding circuit 16 via a signal line 10a. The reading circuit 10 is constructed by an image pickup device such as a CCD (charge coupled device) or the like and an optical system.

An encoding circuit 12 encodes the read data by an MH (Modified Huffman) coding or MR (Modified Read) coding and supplies the coded data to a modulator 14 via a signal line 12a.

A V27ter or V29 modulator 14 performs the modulation based on the well-known CCITT recommendation V27ter (differential phase modulation) or V29 (orthogonal modulation) to the coded output which is supplied from the signal line 12a of the encoding circuit 12. The output modulation data of the modulator 14 is supplied to the adding circuit 16 through a signal line 14a.

The adding circuit 16 adds outputs of the modulators 8 and 14. An output of the adding circuit 16 is sent to the hybrid circuit 6.

The V21 demodulator 18 executes the demodulation based on the well-known CCITT recommendation V21. The demodulator 18 receives the procedure signal from the hybrid circuit 6 via the signal line 6a and executes the V21 demodulation and sends the demodulated data to the control circuit 42 through a signal line 18a.

A V27ter or V29 demodulator 20 executes the demodulation based on the well-known CCITT recommendation V27ter or V29. The demodulator 20 receives the modulated image signal from the hybrid circuit 6 and executes the demodulation and supplies the demodulated data to a memory circuit 22 and a decoding circuit 24 via a signal line 20a.

The memory circuit 22 accumulates the demodulated data from the demodulator 20 on the basis of a signal which is transmitted from the control circuit 42 via a control line 42c and supplies the accumulated data to the decoding circuit 24 by a signal line 22a.

The decoding circuit 24 decodes the demodulated data from the demodulator 20 or memory circuit 22 (by the MH decoding or MR decoding). That is, when a signal level of a signal line 42d is set to "0", the decoding circuit 24 receives the data from the signal line 20a. When the signal level of the signal line 42d is set to "1", the decoding circuit 24 receives the data from the signal line 22a. The decoded data from the decoding circuit 24 is supplied to a recording circuit 26 through a signal line 24a.

The recording circuit 26 receives the decoded data supplied from the decoding circuit 24 to the signal line 24a and sequentially records every line. In this instance, the data is recorded by a thermal method, a thermal copy transfer method, an ink jet method, a thermal jet method, an electrophotographing method, or the like. When a stamp signal is outputted from a stamp circuit 28 through a signal line 28a, the recording circuit 26 records a stamp image onto a recorded sheet by the same recording unit as the recording unit of the decoded image. It is also possible to construct in a manner such that the recording is executed by different methods such that the decoded image data is recorded by the electrophotographing method of black and the stamp image data is recorded by the thermal jet method of red. It is also possible to construct such that a printing block of a stamp is provided and the block is pressed to record the stamp image. When a bind command pulse is generated onto a signal line 42e, the recording circuit 26 binds the papers which have been recorded so far by using a stapler.

When the stamp command pulse is generated from the control circuit 42 to a signal line 42f, the stamping circuit 28 receives the stamp data generated to a signal line 30a and outputs the stamp signal according to the content of the stamp data to the signal line 28a. The recording circuit 26 records the stamp image in accordance with the stamp signal from the signal line 28a.

A stamp data registering circuit 30 stores eleven kinds of stamp data of, for example, stamp Nos. 01 to 11. The numbers 01 to 10 indicate the stamp numbers which are recorded in correspondence to the number of copies when a plurality of copies are outputted. That is, when three copies are outputted, the stamps of 01 to 03 are recorded. The stamp number 11 indicates the stamp data which is recorded upon confidential reception.

In case of storing the stamp data into the stamp data registering circuit 30, the stamp numbers 01 to 10 or the stamp number 11 is outputted to the signal line 30a and, after that, the stamp data is generated and a write pulse is generated onto a signal line 42g. On the other hand, in the case where the control circuit 42 reads out the stamp data stored in the registering circuit 30, the stamp numbers 01 to 11 are outputted to the signal line 30a and, after that, a read pulse is generated to a signal line 42h. Due to this, the stamp data registering circuit 30 outputs the stored stamp data to a signal line 30b in correspondence to the stamp numbers 01 to 11.

Upon recording of the received information, when the signals from 01 to 11 are outputted to a signal line 42p, the stamp data registering circuit 30 outputs the stamp data stored in correspondence to the numbers registered in accordance with the stamp numbers 01 to 11 mentioned above to the signal line 30b. When the signal of 00 has been outputted to the signal line 42p, the stamp data registering circuit 30 outputs nothing to the signal line 30b.

A specific partner registering circuit 32 is a registering circuit to store lower six digits of the telephone number of the specific partner side in order to make it effective to output a plurality of copies of the received information only upon reception from the specific partner. In the embodiment, for instance, 100 telephone numbers can be registered as abbreviation numbers 00 to 99.

In case of storing the telephone numbers into the specific partner registering circuit 32, the numbers 00 to 99 and the lower six digits of the telephone numbers are sequentially outputted to a signal line 32a. After that, a write pulse is generated to a signal line 42i. When the control circuit 42 reads out the telephone numbers stored in the registering circuit 32, the numbers 00 to 99 are outputted to the signal line 32a and, after that, a read pulse is generated to a signal line 42j. Due to this, the registering circuit 32 outputs the telephone numbers registered in correspondence to the telephone numbers to the signal line 32a.

A circuit 34 for registering the number of copies stores the number of copies to for the received information. In case of registering the number of outputted copies to the circuit 34, the number of outputted copies is supplied to a signal line 34a and, after that, a write pulse is generated to a signal line 42k. When the control circuit 42 reads out the number of outputted copies stored in the registering circuit 34, a read pulse is generated to a signal line 42l. Due to this, the registering circuit 34 outputs the stored number of outputted copies to the signal line 34a.

A stamp page registering circuit 36 specifies the page in which the stamp image is recorded. In case of recording the stamp image to only the first page, "0" is stored. In case of recording the stamp image to all of the pages, "1" is stored. In the case where the pages in which the stamp image is recorded are registered into the stamp page registering circuit 36, "0" or "1" is outputted to a signal line 36a and, after that, a write pulse is generated to a signal line 42m. When the control circuit 42 reads out the stamp page information stored in the registering circuit 36, a read pulse is generated to a signal line 42n. Due to this, the registering circuit 36 outputs the information of the stamp pages stored to the signal line 36a.

An operation unit 38 has a one-touch key, an abbreviation dial key, a ten-key a start button, a stamp data registration key, a specific partner registration key, a number of outputted copies registration key, a stamp page registration key, and the like. Information indicative of the depression of either one of those keys is outputted to a signal line 38a.

A display unit 40 is an LCD (liquid crystal display) or the like for receiving message information or the like which has been supplied from the control circuit 42 to a signal line 42o and for displaying.

The control circuit 42 controls the whole apparatus. Particularly, in the embodiment, the control circuit 42 controls the setting of the number of copies, the recording of the stamp image, or the like in case of outputting a plurality of copies of the received information. In the embodiment, the stamp data which is recorded for the received information can be selected by the user by a key operation of the operation unit 38.

Figure 2:
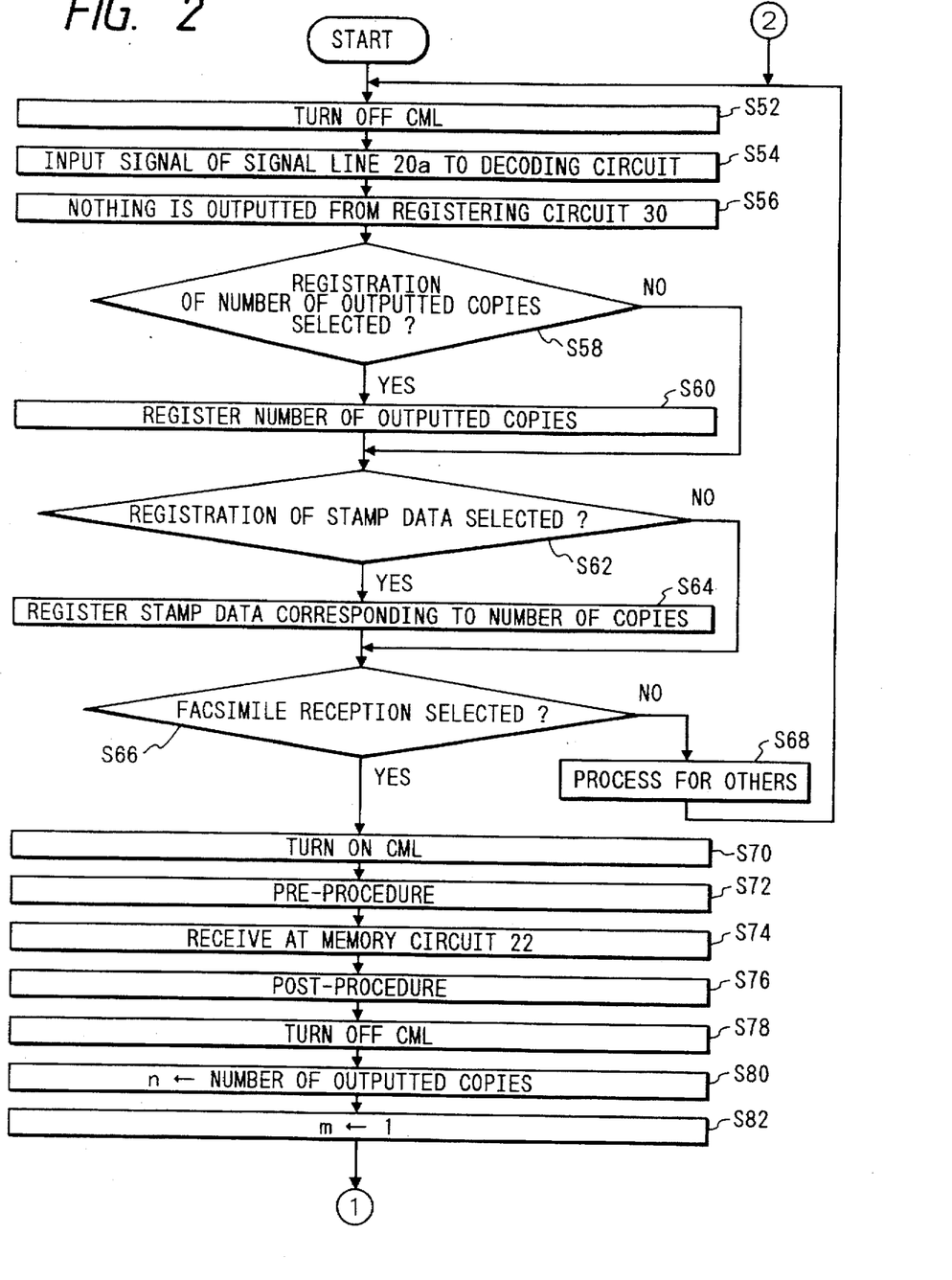
FIG. 2 is a flowchart showing the operation of the embodiment.
Figure 3:
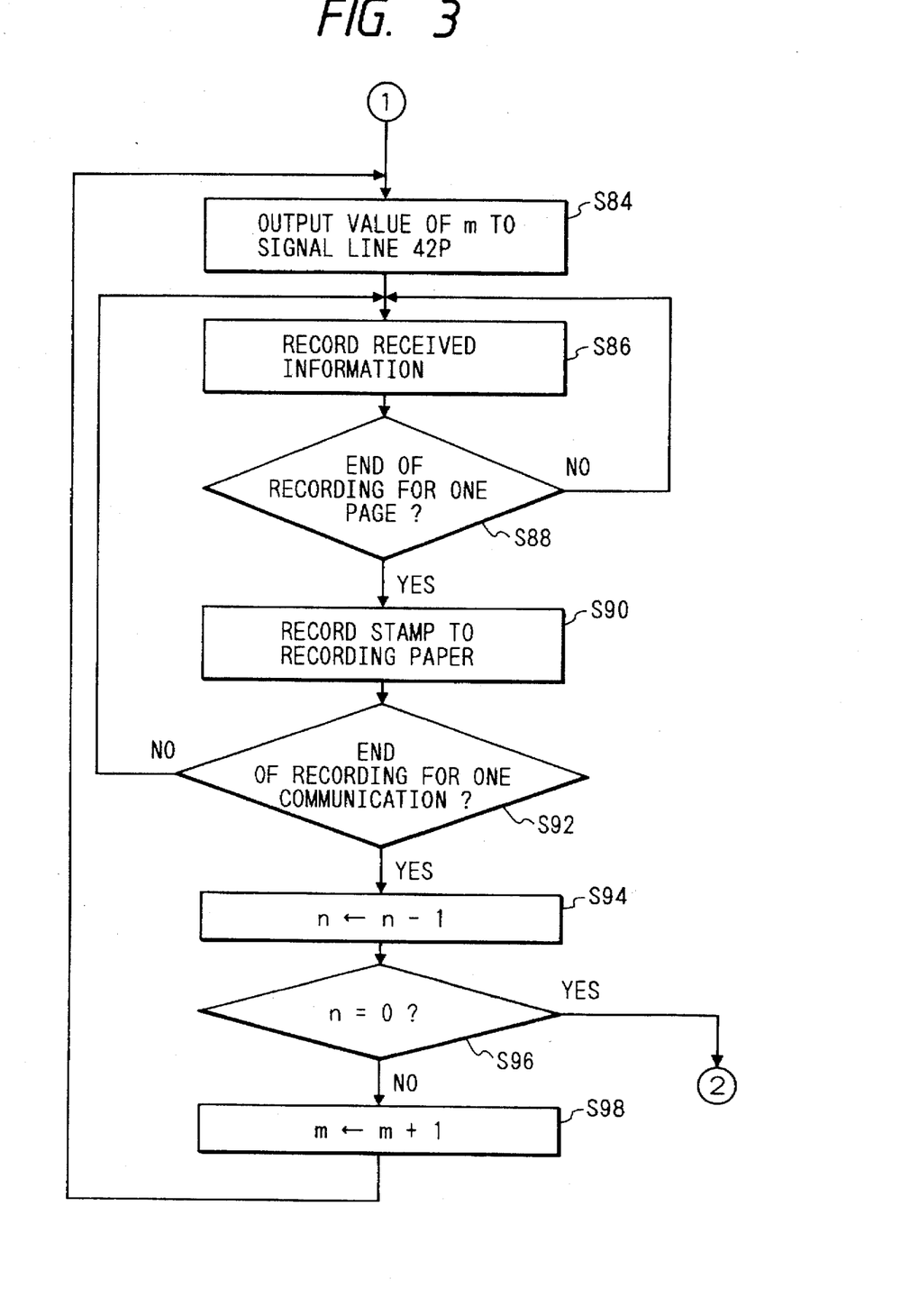
FIG. 3 is a flowchart showing the operation of the embodiment.

FIGS. 2 and 3 are flowcharts showing the control operation in the control circuit 42.

First, in step S52, the control circuit 42 outputs the signal level "0" to the signal line 42a, that is, turns off a CML function (function for connecting a modem to a line). In step S54, the control circuit 42 outputs the signal level "0" to the signal line 42d, thereby setting such that the decoding circuit 24 receives the signal on the signal line 20a.

In step S56, the signal 00 is outputted to the signal line 42p, thereby setting a state in which the stamp data registering circuit 30 outputs nothing to the signal line 30a. In step S58, the signal on the signal line 38a is received and a check is made to see if the registering operation of the number of outputted copies to output a plurality of copies from the received information has been selected by the operation unit 38 or not. When the registration of the number of outputted copies is selected, in step S60, the number of outputted copies is registered into the registering circuit 34.

In the next step S62, the signal on the signal line 38a is received and a check is made to see if the registration of the stamp data corresponding to the number of outputted copies has been selected or not. When the registration of the stamp data corresponding to the number of outputted copies is selected, the stamp data which is recorded in correspondence to the number of outputted copies is registered into the stamp data registering circuit 30 (S64). In the above operations, the stamp data registration key is depressed in the operation unit 38. After that, the stamp number is instructed by using the ten-key. Further, the ten-key or the like is changed into a character input mode, thereby enabling alphabets or the like to be inputted. Desired characters such as alphabets or the like are registered as stamp data. By depressing the set key, the registration of the stamp for the stamp number is completed. In this manner, the user can record an arbitrary stamp to each received image. As a content of the stamp image, it is possible to widely use various stamp images such as stamp indicative of the attribute of the original line "original", "circulation", "preservation", or the like, stamp indicative of the dispensing destination like "president xxx", "circulation in  first development division" or "circulation in  second development division", and the like.

In step S66, a check is made to see if the facsimile reception has been selected or not. If NO, step S68 follows and the other processes are executed.

When the facsimile reception is selected, step S70 follows and the signal level "1" is outputted to the signal line 42a and the CML is turned on. A pre-procedure is executed in step S72. In step S74, the image data is received in the memory circuit 22. A post-procedure is executed in step S76.

After that, in step S78, the signal level "0" is outputted to the signal line 42a and the CML is turned off. In step S80, the number of outputted copies registered in the registering circuit 34 is inputted and the value indicative of such a number of copies is stored into a counter n.

In step S82, the number of outputted copies is counted and "1" is set into a counter m which is used to designate the stamp data which is recorded.

In step S84, the count value of the counter m is outputted to the signal line 42p and the stamp data which is recorded is designated. In step S86, the signal at the signal level "1" is outputted to the signal line 42d. The decoding circuit 24 receives the signal on the signal line 22a and the supplies the decoded data to the recording circuit 26, thereby recording the received information.

In step S88, a check is made to see if the recording of one page has been finished or not. After completion of the recording of one page, a stamp command pulse is generated to the signal line 42f, thereby recording the stamp image onto the recording paper (S90).

A check is made in step S92 to see if the recording of the data corresponding to one communication has been finished or not. If NO, the processing routine is returned to step S86. If YES, step S94 follows and the count value of the counter n is increased by "1".

In step S96, a check is made to see if the count value of the counter n is equal to 0 or not, namely, the outputting operation of the copies of the number of outputted copies has been finished or not. When n is equal to 0, the processing routine is returned to the initial state (S52). When n is not equal to 0, the count value of the counter m indicative of the number of outputted copies is increased by "1" in step S98. The processing routine is returned to step S84 and the above processes are repeated.

As mentioned above, a plurality of copies of the received image on which the different stamps were recorded can be obtained. The recording papers on which the received information was recorded can be sorted every copy by a sorter.

The above embodiment has been described on the assumption that a plurality of copies are outputted with respect to all of the received images. As a second embodiment, however, it is also possible to output a plurality of copies with respect to only the received image from the specific partner registered in the specific partner registering circuit 32.

It is also possible to record the received image after the stamp image was recorded.

Figure 4A:
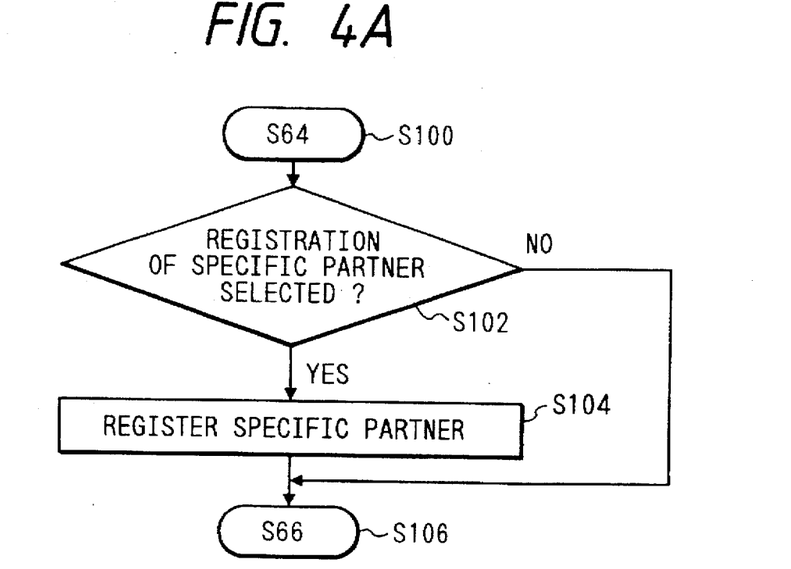
FIGS. 4A and 4B are flowcharts showing the operation of the second embodiment of the invention.
Figure 4B:
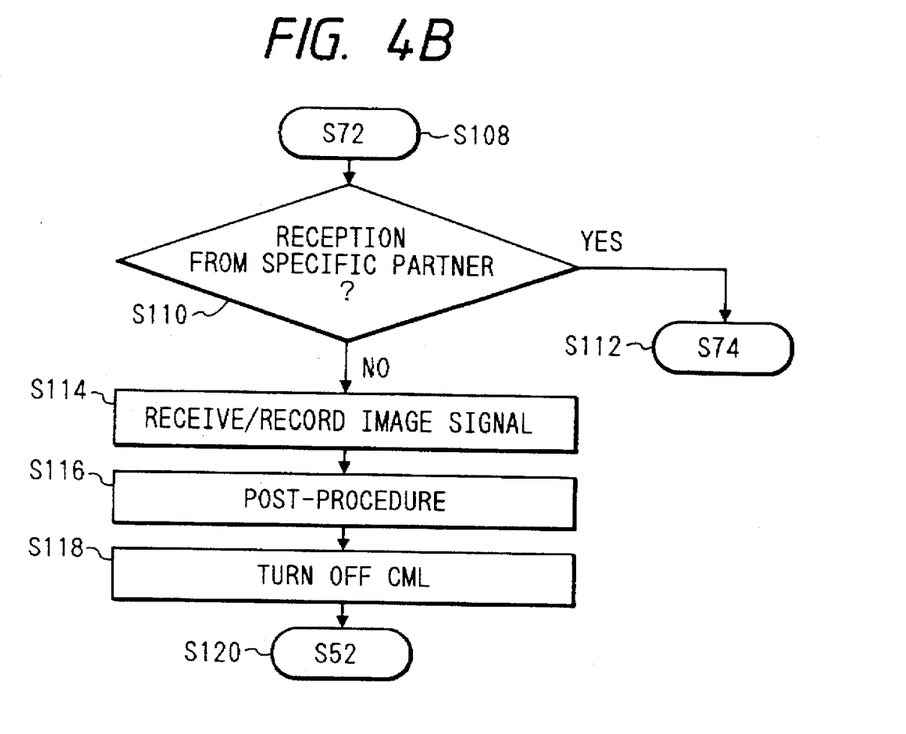

FIGS. 4A and 4B are flowcharts showing the operation in such a case. In FIGS. 4A and 4B, only the portions different from the above embodiment are shown.

As shown in the diagrams, in step S64 and subsequent steps in FIG. 2 mentioned above, the process to register the specific partner to which a plurality of copies of the received information are outputted is executed (S100). First, a check is made to see if the registration of the specific partner has been selected by depression of the specific partner registration key or not (S102). If YES, the specific partner is registered into the specific partner registering circuit 32 (S104). The processing routine advances to step S66 in FIG. 2 (S106).

The pre-procedure is now executed in step S72 in FIG. 2 (S108). In the pre-procedure, the information in the specific partner registering circuit 32 is received and compared with lower six digits of a TSI signal which is transmitted from the partner apparatus, thereby discriminating whether the reception is made from the special partner side or not (S110). In case of the reception from the specific partner side, step S74 and subsequent steps follow and the process to output a plurality of copies of the received information is executed (S112). If NO in step S110, the reception/recording of the image signal similar to those of the conventional apparatus are executed (S114). The received information is recorded one paper by one and the post-procedure (S116) is executed. After that, the signal level "0" is outputted to the signal line 42a and the CML is turned off (S118). The processing routine is returned to the initial state (S120).

On the contrary to the above second embodiment, as a third embodiment, it is also possible to construct in a manner such that the copies are ordinarily outputted one by one to only the special partner and a plurality of copies are outputted with respect to the received information from partners other than the specific partner. The above processes in the third embodiment can be realized by merely reversing the judgment of YES and NO in step S110 in FIG. 4B. Therefore, its practical explanation is omitted here.

In such a facsimile apparatus, when there is a confidential reception, if a plurality of copies are outputted, the meaning of the confidential reception is lost. Therefore, it is inhibited to output a plurality of copies and a special stamp (confidential stamp data registered in correspondence to the stamp number "11" in the stamp data registering circuit 30) can be also recorded.

Figure 5:
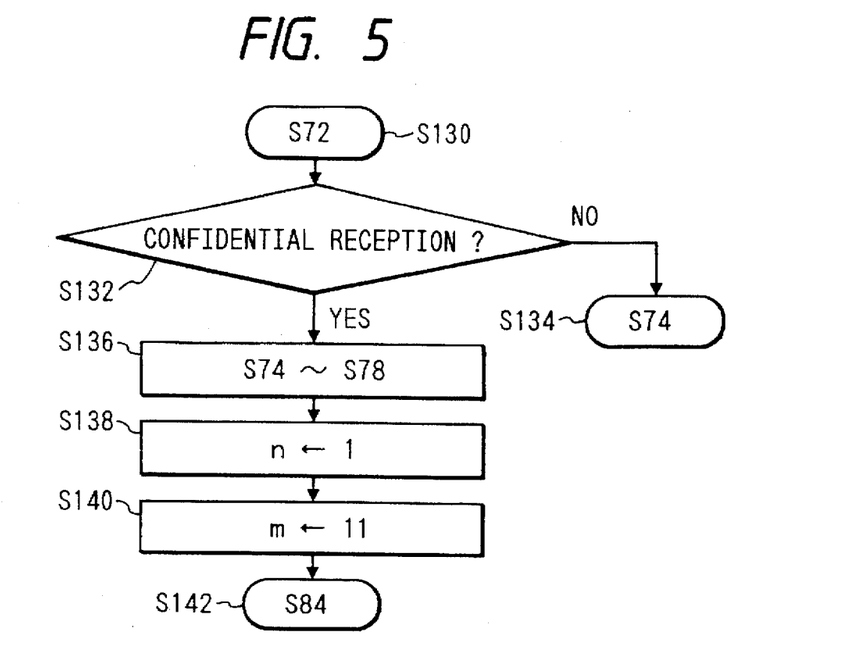
FIG. 5 is a flowchart showing the operation of the fourth embodiment of the invention.

FIG. 5 is a flowchart showing the operation in the above case. In FIG. 5 as well, only the portions different from the first embodiment are shown.

As shown in the diagram, in step S72 (S130) and subsequent steps in FIG. 2, a check is made to see if there is a confidential reception or not (S132). If NO, the processing routine advances to step S74 and subsequent steps and a plurality of copies of the received information are outputted and the stamp corresponding to each information is recorded (S134). In case of the confidential reception, in steps S74 to S78 in FIG. 2, the received information is stored into the memory circuit 22 and the CML is turned off (S136). In step S138, "1" is set into the count value n and the number of outputted copies is set to "1". In step S140, "11" is set into the count value m and the stamp data "11" is outputted. After that, the processing routine advances to step S84 and subsequent steps (S142).

The fourth embodiment has been described on the assumption that the processes in FIG. 5 are added to the processes in the first embodiment. The invention, however, is not limited to the above construction but the fourth embodiment can be also combined to the second or third embodiment.

As a fifth embodiment, either one of the mode to record the stamp image as mentioned above to only the first page and the mode to record the stamp image to all of the pages can be selected by using the stamp page registering circuit 36.

Figure 6A:
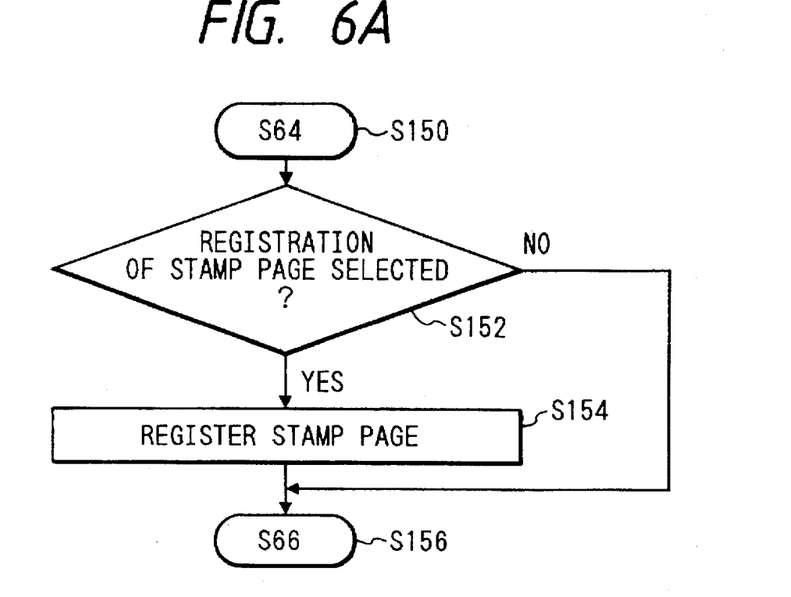
FIGS. 6A and 6B are flowcharts showing the operation of the fifth embodiment of the invention.
Figure 6B:
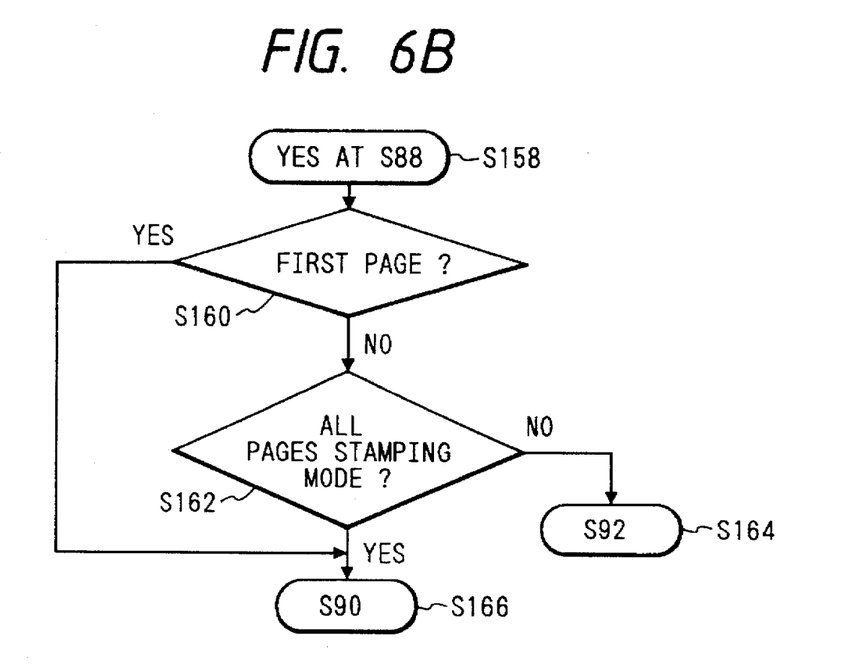

FIGS. 6A and 6B flowcharts showing the operation in the above case. In FIGS. 6A and 6B as well, only the portions different from those in the above first embodiment are shown.

In FIGS. 6A and 6B, after step S64 and subsequent steps in FIG. 2, the processing routine is started (S150). First, in step S152, a check is made to see if the registering process to designate the pages on which the stamps are recorded has been selected by the depression of the stamp page registration key or not. If YES, the pages on which the stamps are recorded are registered into the stamp page registering circuit 36 (S154). The processing routine is returned to step S66 in FIG. 2 (S156).

In step S88 in FIG. 2, when the recording of the image information of one page is finished (S158), a check is made in step S160 to see if the image information is recorded to the first page or not. If YES, the processing routine advances to step S90 in FIG. 3 and the stamps are recorded (S166).

If NO in step S160, step S162 follows and the information of the stamp page registering circuit 36 is inputted and a check is made to see if the mode to record the stamps to all of the pages has been designated or not.

When the mode to record the stamps to all of the pages is designated, step S90 follows (S166). If NO in step S162, step S92 follows (S164).

As a sixth embodiment, it is also possible to construct in a manner such that when the binding function is valid, namely, when there are staple needles, the stamp is recorded to only the first page and when the binding function is invalid, namely, when there is no staple needle, the stamps are recorded to all of the pages.

Figure 7:
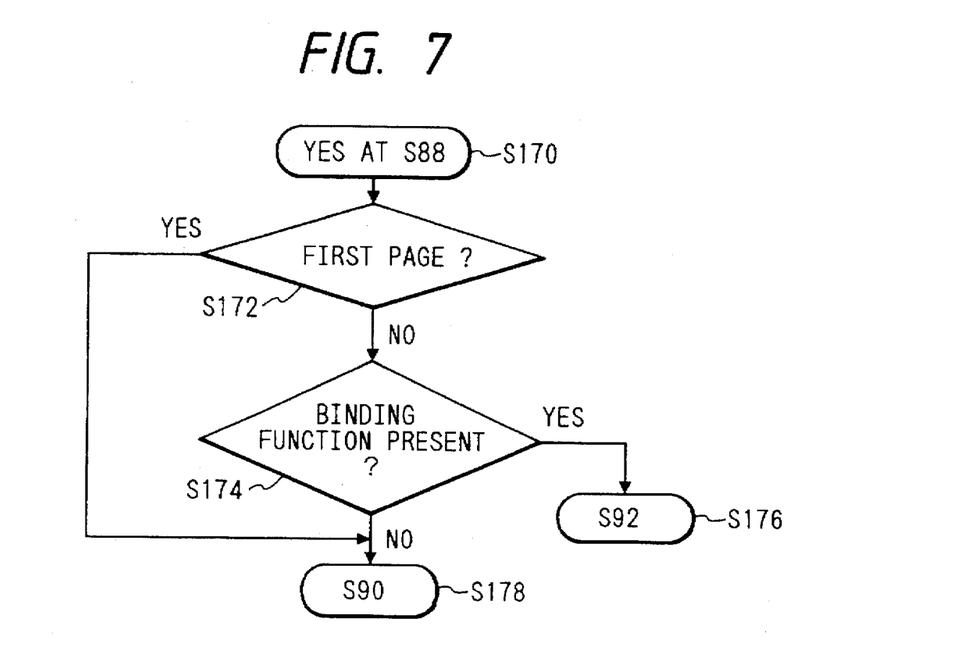
FIG. 7 is a flowchart showing the operation of the sixth embodiment of the invention.

FIG. 7 is a flowchart showing the operation in the above case. In FIG. 7 as well, only the portions different from those in the first embodiment are shown.

In FIG. 7, after step S64 and subsequent steps in FIG. 2 mentioned above, the processing routine is started (S170). First, in step S172, a check is made to see if the recording page is the first page or not. In case of the recording of the first page, step S90 follows and the stamp is recorded (S178). If NO in step S172, a check is made in step S174 to see if there is the binding function or not. When there is the binding function, step S92 follows (S176). If NO, step S90 follows (S178) and the stamp is recorded.

The above fifth and sixth embodiments have been described on the assumption that the processes in FIGS. 6A, 6B and 7 are added to those in the first embodiment. However, it is also possible to construct such that those processes are combined with the processes in the second to fourth embodiments. The above embodiments can be also arbitrarily combined as necessary. A plurality of stamp images can be also recorded.

As described above, by outputting a plurality of copies of the received information and by recording the stamps upon output, for instance, which ones of the received images are set to the originals can be easily determined. In addition, it is possible to obtain conveniences such that it is possible to easily discriminate that each received image is the information having which purpose and the like. Therefore, when the received information is distributed or abandoned, it is convenient.

It is also possible to prevent that a plurality of copies such as direct mails or the like are outputted by outputting a plurality of copies only at the time of reception from the specific partner. A vain consumption of the recording papers can be prevented.

In the confidential reception, a plurality of copies are not outputted but are stored into a memory. When the output of the confidential received information is selected, for instance, a stamp indicative of the confidential reception is recorded onto the recording paper and the paper can be outputted. Therefore, even in a combination with the confidential function, an enough convenience can be obtained.

By controlling such that when the binding function by using a stapler or the like is provided, the stamp is recorded to only the first page, and when there is not the binding function using the stapler or the like, the stamps are recorded to all of the pages, so that the stamps can be properly recorded in accordance with the presence or absence of the binding function.

The present invention can be also applied to a printing apparatus, a copying apparatus, and the like other than the facsimile apparatus.

What is claimed is:

1. An image reading apparatus comprising:
   receiving means for receiving image data;
   memory means for storing a plurality of different additional image data;
   selecting means for selecting one of the additional image data stored in said memory means;
   recording means for recording the image data from said receiving means and the additional image data selected by said selecting means onto a recording sheet; and
   binding means for binding a plurality of recording sheets,
   wherein when use of said binding means is selected, said recording means records the additional image data to the recording sheet of the first page, and when use of said binding means is not selected, said recording means records the additional image data to all of the pages of the recording sheets.

2. An apparatus according to claim 1, wherein said recording means records the received image data and the additional image data onto one recording sheet.

3. An apparatus according to claim 1, further comprising number of copies setting means for setting the number of copies which are recorded by said recording means, wherein said recording means performs the recording of the number of copies set by said number of copies setting means and also records the additional image data in the recording of each copy.

4. An apparatus according to claim 3, wherein said recording means selects the different additional image data every recording of each copy from said memory means and records the selected additional image data.

5. An apparatus according to claim 3, wherein when the reception by said receiving means is a confidential reception, said recording means performs the recording of one copy irrespective of the number of copies set by said number of copies setting means.

6. An apparatus according to claim 3, wherein when said receiving means receives the image data from a prespecified partner, said recording means performs the recording of one copy irrespective of the number of copies set by said number of copies setting means.

7. An apparatus according to claim 3, wherein when said receiving means receives the image data from a partner different from a prespecified partner, said recording means performs the recording of one copy irrespective of the number of copies set by said number of copies setting means.

8. An apparatus according to claim 1, wherein said additional data is data of a stamp image indicative of dispensing distribution of the recording sheets.

9. A method of recording images comprising the steps of:
receiving image data;
storing a plurality of different additional image data;
selecting one of the stored additional image data;
recording the received image data and the selected additional image data onto a recording sheet; and
selectively binding a plurality of recording sheets,
wherein when binding is selected, the additional image data is recorded on the recording sheet of the first page, and when binding is not selected, the additional image data is recorded on all of the pages of the recording sheets.

10. A method according to claim 9, wherein said recording comprises recording the received image data and the additional image data onto one recording sheet.

11. A method according to claim 9, further comprising:
setting the number of copies which are recorded, wherein the set number of copies are recorded and the additional image data is recorded on each copy.

12. A method according to claim 11, wherein said selecting comprises selecting the different additional image data for every recording of each copy and the selected additional image is recorded.

13. A method according to claim 11, wherein when said receiving comprises receiving confidential data, said recording comprises recording one copy irrespective of the number of copies set in said setting step.

14. A method according to claim 11, wherein when said receiving comprises receiving the image data from a prespecified partner, said recording comprises recording one copy irrespective of the number of copies set in said setting step.

15. A method according to claim 11, wherein when said receiving comprises receiving the image data from a partner different from a prespecified partner, said recording comprises recording one copy irrespective of the number of copies set in said setting step.

16. A method according to claim 9, wherein the additional data is data of a stamp image indicative of dispensing distribution of the recording sheets.

17. A facsimile apparatus comprising:
receiving means for receiving image data;
recording means for recording the image data received by said receiving means onto a recording sheet; and
setting means for setting the number of copies which are recorded by said recording means,
wherein said recording means records the number of copies set by said setting means, and
wherein when the image data received by said receiving means is confidential image data, said recording means records only one copy of the image data irrespective of the number of copies set by said setting means.

18. An apparatus according to claim 17, further comprising memory means for storing additional image data,
wherein said recording means records the received image data and the additional image data on the recording sheet in accordance with the additional image data stored in said memory means.

19. An image recording apparatus comprising:
receiving means for receiving image data;
memory means for storing additional image data;
selecting means for selecting a mode of operation of said apparatus in which the additional image data is recorded on a first page of the recording sheets or a mode of operation of said apparatus in which the additional image data is recorded on all pages of the recording sheets; and
recording means for recording the image data received by said receiving means and the additional image data onto a recording sheet in accordance with the mode selected by said selecting means.

20. An apparatus according to claim 1, wherein said receiving means performs facsimile reception.

21. A facsimile recording method comprising the steps of:
receiving image data;
recording the image data received in said receiving step onto a recording sheet; and
setting the number of copies which are recorded by said recording step,
wherein said recording step records the number of copies set by said setting step, and
wherein when the image data received in said receiving step is confidential image data, said recording step records only one copy of the image data irrespective of the number of copies set by said setting step.

22. A method according to claim 21, further comprising the step of recording additional image data, wherein said recording step records the received image data and the additional image data on the recording sheet in accordance with the stored, additional image data.

23. An image recording method comprising the steps of:
receiving image data;
storing additional image data;
selecting a mode of operation in which the additional image data is recorded on a first page of a plurality of recording sheets or a mode of operation in which the additional image data is recorded on all pages of the recording sheets; and
recording the image data received in said receiving step and the additional image data onto a recording sheet in accordance with the mode selected by said selecting step.

24. An image recording apparatus comprising:
input means for inputting image data;

memory means for storing additional image data;

selecting means for selecting one of a mode of operation of said apparatus in which the additional image data is recorded on a recording sheet of a predetermined page and a mode of operation of said apparatus in which the additional image data is recorded on recording sheets of all pages; and recording means for recording the image data input by said input means and the additional image data onto a recording sheet in accordance with the mode selected by said selecting means.

25. An image recording method comprising the steps of:

inputting image data;

storing additional image data;

selecting one of a mode of operation in which the additional image data is recorded on a recording sheet of a predetermined page and a mode of operation in which the additional image data is recorded on recording sheets of all pages; and recording the image data input in said input step and the additional image data onto a recording sheet in accordance with the mode selected in said selecting step.

26. A facsimile apparatus comprising:

receiving means for receiving image data;

recording means for recording the image data received by said receiving means onto a recording sheet;

setting means for setting the number of copies of the image data to be recorded by said recording means at a reception site;

recognizing means for recognizing an identification of a facsimile apparatus at a transmission site which is transmitting the image data to said receiving means; and selecting means for selecting, in accordance with a recognition result of said recognizing means, one of a first mode in which one copy of the received image data is recorded and a second mode in which the number of copies set by said setting means of the received image are recorded.

27. An apparatus according to claim 26, wherein when said recognizing means recognizes a facsimile apparatus at a predetermined transmission site, the second mode is selected.

28. An apparatus according to claim 26, wherein when said recognizing means recognizes a facsimile apparatus at a predetermined site, the first mode is selected.

29. An apparatus according to claim 26, wherein said recording means records the image data received by said receiving means and additional image data.

30. A method of operating a facsimile apparatus, comprising the steps of:

receiving image data;

recording the image data received in said receiving step onto a recording sheet;

setting the number of copies of the image data to be recorded in said recording step at a reception site;

recognizing an identification of a facsimile apparatus at a transmission site which is transmitting the image data received in said receiving step at the reception site; and selecting, in accordance with a recognition result of said recognizing step, one of a first mode in which one copy of the received image data is recorded and a second mode in which the number of copies set in said setting step of the received image are recorded.

31. A method according to claim 30, wherein when said recognizing step recognizes a facsimile apparatus at a predetermined transmission site, the second mode is selected.

32. A method according to claim 30, wherein when said recognizing step recognizes a facsimile apparatus at a predetermined site, the first mode is selected.

33. A method according to claim 30, wherein said recording step records the image data received in said receiving step and additional image data.

34. A facsimile apparatus comprising:

receiving means for receiving image data from an apparatus at a transmission site;

recording means for recording the image data received by said receiving means onto a recording sheet; and setting means for setting a number of copies of the image data to be recorded by said recording means at a reception site, wherein said recording means performs recording in accordance with the number of copies set by said setting means.

35. An apparatus according to claim 34, wherein said setting means is an operation unit having an operation key.

36. A method of operating a facsimile apparatus comprising the steps of:

receiving image data from an apparatus at a transmission site;

recording the image data received in said receiving step onto a recording sheet; and setting a number of copies of the image data to be recorded in said recording step at a reception site, wherein said recording step performs recording in accordance with the number of copies set in said setting step.

37. A method according to claim 36, wherein said setting step uses an operation unit having an operation key.

38. An apparatus according to claim 24, further comprising number-of-copies setting means for setting the number of copies which are recorded by said recording means, wherein said recording means performs the recording of the number of copies set by said number-of-copies setting means and records the additional image data in the recording of each copy.

39. An apparatus according to claim 24, wherein when the image data of a plurality of pages is recorded, said recording means records the image data from said input means and the additional image data from said memory means onto a recording sheet of a predetermined page.

40. An apparatus according to claim 24, wherein when the image data from said input means is specific image data, said recording means records the additional image data.

41. An apparatus according to claim 24, wherein said memory means stores a plurality of kinds of additional image data, and said recording means selects additional image data from said memory means according to the kind of image data from said input means and records the selected additional image data.

42. An apparatus according to claim 24, wherein said recording means is one of a facsimile apparatus, a printing apparatus, and a copying apparatus.

43. An apparatus according to claim 24, wherein said recording means is one of a thermal printer, a thermal transfer printer, and ink jet printer, a thermal jet printer, and an electrophotographic printer.

44. An apparatus according to claim 24, wherein said additional data is data of a stamp image indicative of a dispensing distribution of the recording sheets.

45. An apparatus according to claim 24, further comprising binding means for binding a plurality of recording sheets, wherein when use of said binding means is selected, said recording means records an image in accordance with the additional image data on the recording sheet of the first page, and when use of said binding means is not selected, said recording means records an image in accordance with the additional image data to all of the pages of the recording sheets.

46. A method according to claim 25, further comprising the step of setting the number of copies of the image which are to be recorded by the recording means, wherein said recording step comprises the step of recording the number of copies of the image set by said setting step and recording the additional image data in the recording of each copy of the image.

47. A method according to claim 25, wherein when the image data of a plurality of pages is recorded, said recording step records the image data from the input means on the plurality of pages and records the stored additional image data onto a recording sheet of a predetermined page.

48. A method according to claim 25, wherein when the image data inputted in said inputting step is specific image data, said recording step records the additional image data.

49. A method according to claim 25, further comprising the step of selecting whether binding of a plurality of recording sheets is to performed, wherein when said binding operation is selected to be performed, said recording step records an image in accordance with the additional image data on the recording sheet of the first page, and when said binding operation is not selected to be performed, said recording step records the image in accordance with the additional image data on all of the pages of the recording sheets.

* * * * *

UNITED STATES PATENT AND TRADEMARK OFFICE
CERTIFICATE OF CORRECTION

PATENT NO. : 5,682,246
DATED : October 28, 1997
INVENTOR(S) : TAKEHIRO YOSHIDA

It is certified that error appears in the above-indentified patent and that said Letters Patent is hereby corrected as shown below:

COLUMN 1

Line 44, "of" should read --to--.

COLUMN 2

Line 57, "V29demodulator" should read --V29 demodulator--.

COLUMN 3

Line 54, "outputs-the" should read --outputs the--.

COLUMN 4

Line 17, "to for" should read --to output for--.
    Line 40, "ten-key" should read --ten-key key-pad,--.

COLUMN 5

Lines 12 "the-registration" should read --the registration--.
    Line 19, "ten-key." should read --ten-key key-pad.-- and "ten-key" should read --ten-key key-pad--.

UNITED STATES PATENT AND TRADEMARK OFFICE
CERTIFICATE OF CORRECTION

PATENT NO.   : 5,682,246
DATED        : October 28, 1997
INVENTOR(S)  : TAKEHIRO YOSHIDA It is certified that error appears in the above-indentified patent and that said Letters Patent is hereby corrected as shown below:

Line 47, no new paragraph after "recorded.".
    Line 52, "the" (third occurrence) should be deleted.

<u>COLUMN 7</u>
    Line 26, "6B" should read --6B are--.

<u>COLUMN 12</u>
    Line 60, "and" (first occurrence) should read --an--.

Signed and Sealed this

Twenty-eighth Day of April, 1998

Attest:

BRUCE LEHMAN

*Attesting Officer*      *Commissioner of Patents and Trademarks*